United States Patent [19]

Arnold et al.

[11] Patent Number: 4,800,786
[45] Date of Patent: Jan. 31, 1989

[54] ELASTOMERIC SLEEVE FOR WRENCH SOCKET AND METHOD OF MANUFACTURE THEREOF

[75] Inventors: Robert L. Arnold, Lancaster; William G. Mader, York, both of Pa.; Philip A. Desmarais, Gastonia, N.C.

[73] Assignee: Easco Hand Tools, Inc., Hunt Valley, Md.

[21] Appl. No.: 49,028

[22] Filed: May 19, 1987

Related U.S. Application Data

[63] Continuation-in-part of Ser. No. 930,249, Nov. 13, 1986, which is a continuation-in-part of Ser. No. 804,533, Dec. 4, 1985.

[51] Int. Cl.$^4$ .............................................. B25B 13/06
[52] U.S. Cl. .............................. 81/121.1; 81/DIG. 5; 81/177.1; 81/180.1
[58] Field of Search ........................ 81/492, 489, 121.1, 81/122–123, DIG. 5, 177.1, 177.85, 180.1, 184–185, 900; 16/116 R, DIG. 12; 408/226

[56] References Cited

U.S. PATENT DOCUMENTS 1,902,438 3/1933 Foley .................................... 81/489

OTHER PUBLICATIONS

*Jensen Tools and Alloys,* Fall Catalog, 1977, p. 86, "Cushion Grip Screwdrivers".
*Husky Mechanics' Hand Tools,* Cat. No. 103, 8/1961, p. 17, "Carbon Socket Wrench Sets", No. 2550.

*Primary Examiner*—Debra Meislin
*Attorney, Agent, or Firm*—Leonard Bloom

[57] ABSTRACT

A molded elastomeric sleeve is secured on the rear portion of a conventional socket for a hand ratchet wrench. Size indicia are carried by the sleeve for ready identification of the socket, and knurls on the sleeve facilitate a manual gripping of the socket for rotation thereof, whenever desired. In a preferred embodiment, the sleeve has a readily-projecting boss provided with a rim and a recess therein. A pressure-sensitive adhesive label, which carries the size indicia, is disposed within the recess below the rim on the boss. An internal annular groove is formed in the sleeve adjacent to the socket, and an adhesive is injected into the internal annular groove via at least one passageway formed in the sleeve. The passageway opens into the recess in the boss on the socket, and the passageway is subsequently covered by the pressure-sensitive adhesive label.

29 Claims, 9 Drawing Sheets

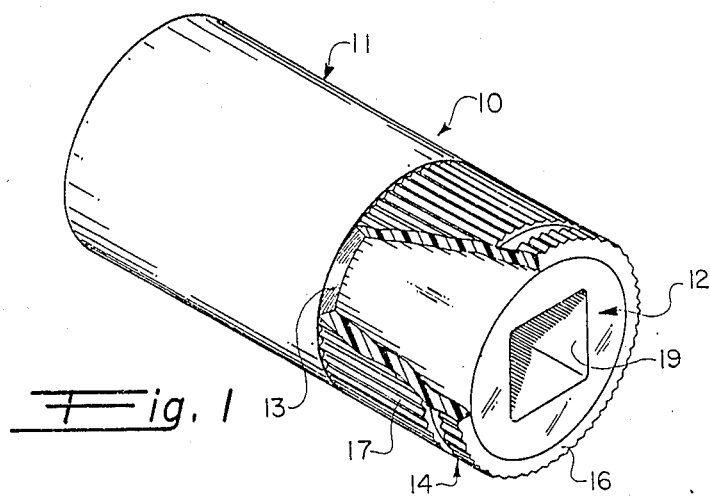
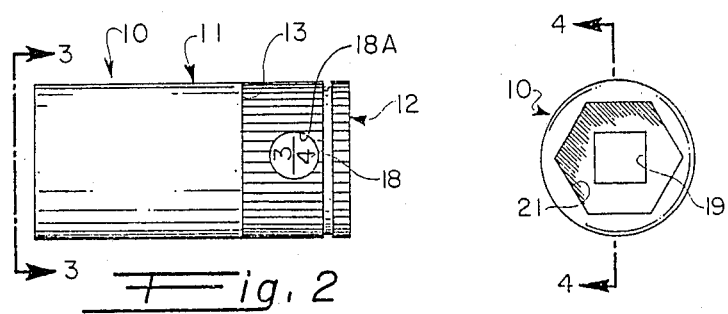
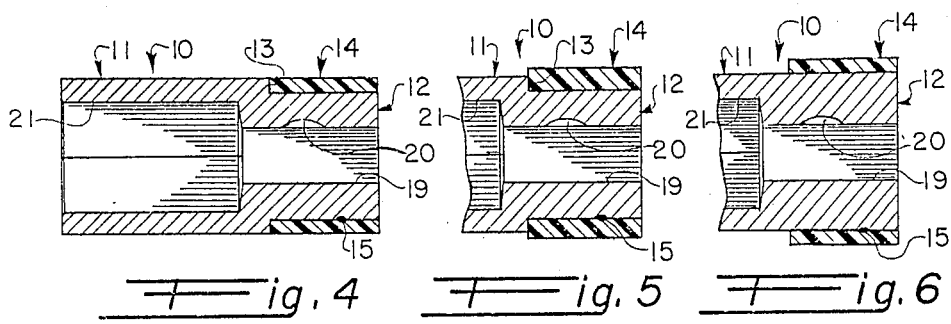

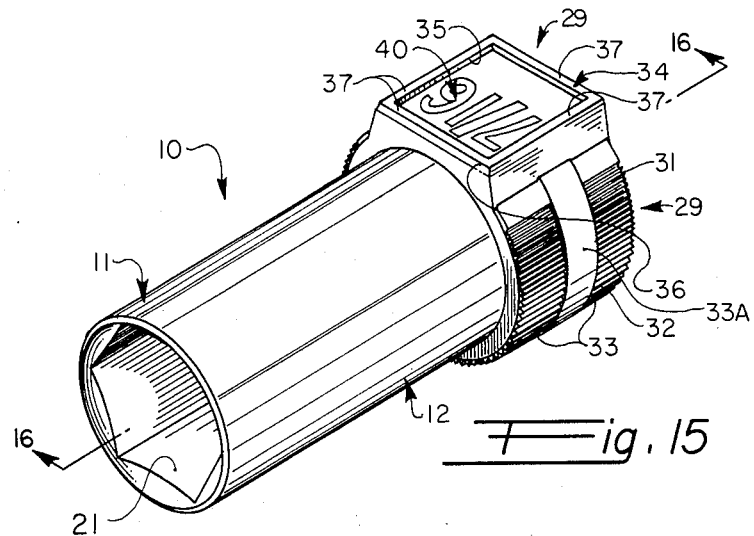
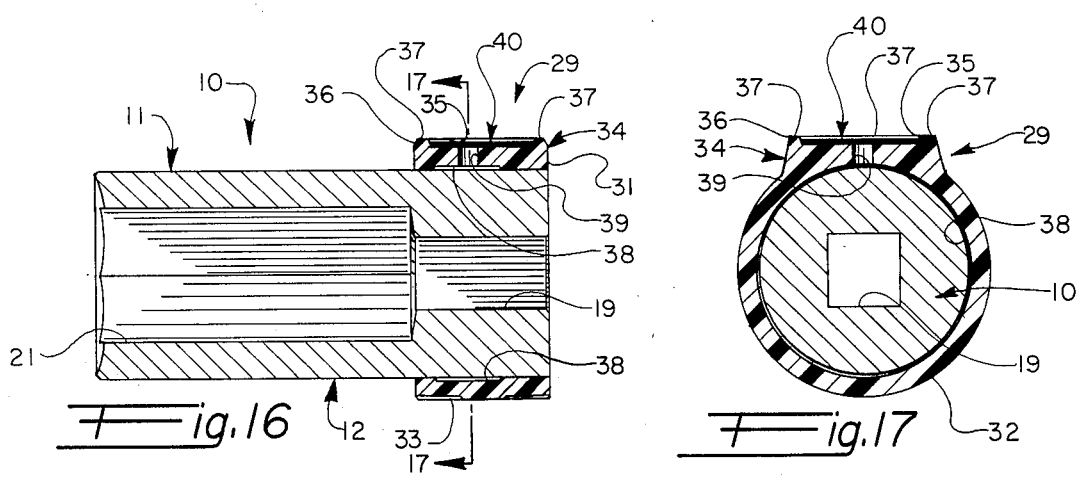
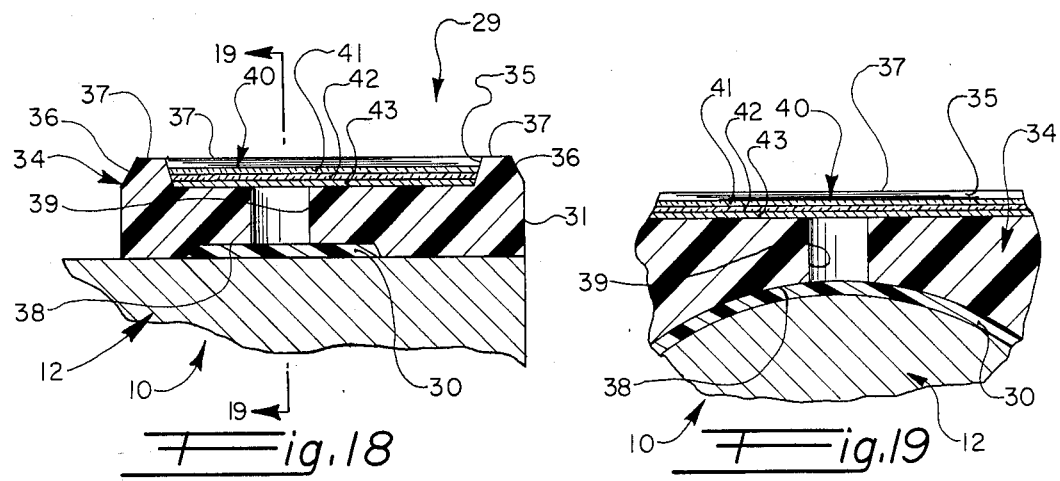

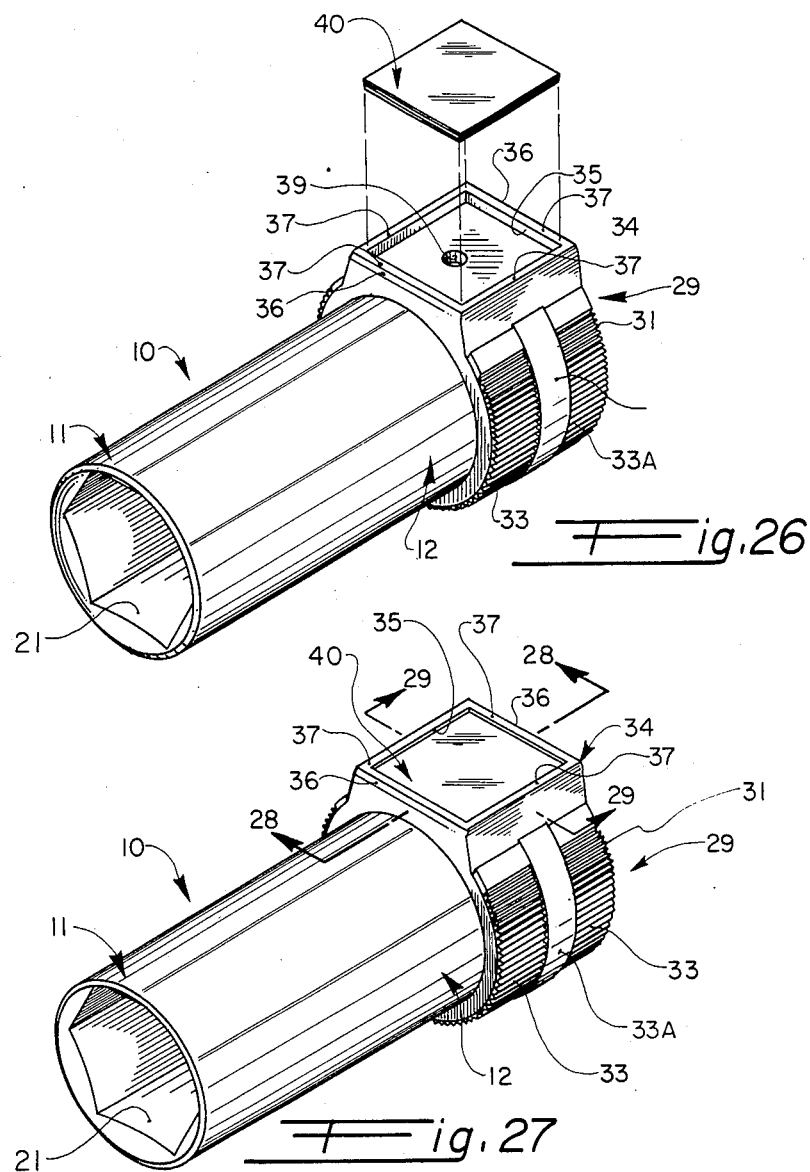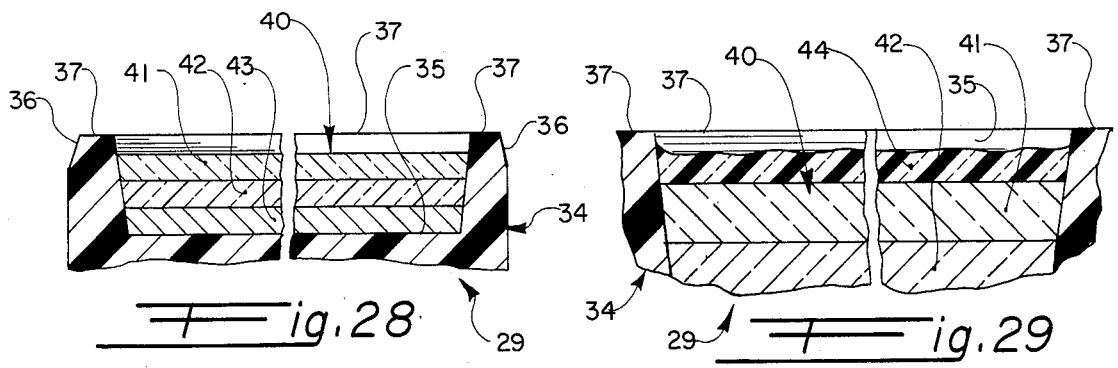

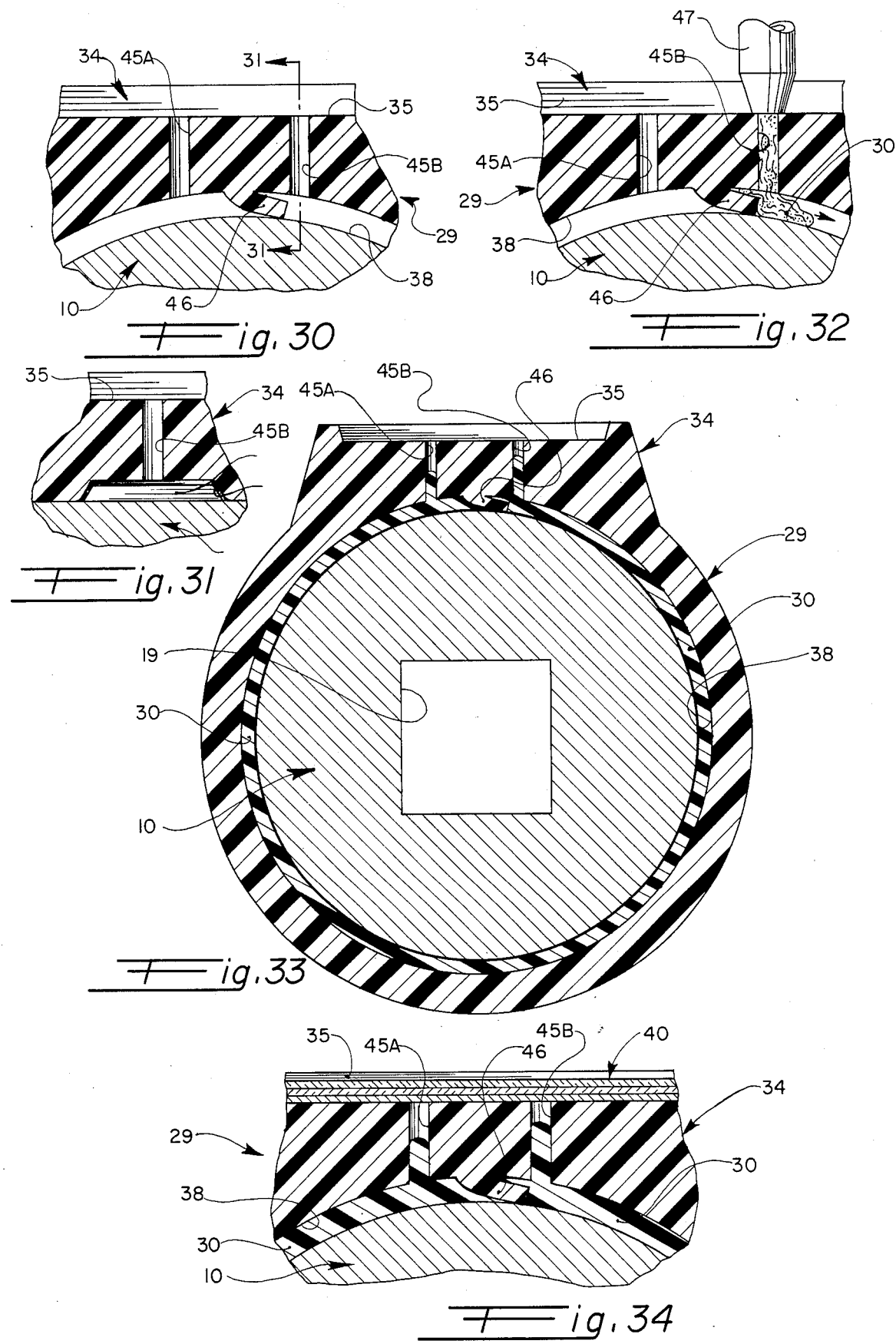

ELASTOMERIC SLEEVE FOR WRENCH SOCKET AND METHOD OF MANUFACTURE THEREOF

CROSS-REFERENCE TO RELATED APPLICATION

The present application is a continuation-in-part of application Ser. No. 930,249 filed Nov. 13, 1986, which in turn is a continuation-in-part of Ser. No. 804,533 filed Dec. 4, 1985, which applications are copending herewith, and the disclosures of which are incorporated herein by their entirety.

FIELD OF THE INVENTION

The present invention relates to an elastomeric sleeve which is secured to the rearward portion of a socket for a ratchet wrench or the like.

BACKGROUND OF THE INVENTION

Socket kits or sets usually have a ratchet wrench, various adapters, accessories or attachments, and a plurality of sockets used interchangeably with the ratchet wrench. The ratchet wrench comprises a driving handle having a square-drive tang or stud. The drive is available in either Metric or English standards, as for example, a ¼", ⅜" or ½" drive. The sockets usually have an output hexagonal bore for engagement with a nut or head of a bolt. According to the English standards, these hexagonal sockets may range, for example, from 3/16" to ¾" in sixteenth inch increments.

The average ratchet wrench kit may have about a dozen individual sockets, each of which is stamped with the size of its output hexagonal bore. These size indications are hard to see, especially when the wrench is used beneath a vehicle, in cramped quarters, or in poorly lighted working areas. The individual pieces in a kit sometimes get mixed up, and the problem may be compounded due to English and Metric sizes. Additionally, the sockets may become lost in a tool box or workshop, as for example, by rolling off a table or workbench.

SUMMARY OF THE INVENTION

Accordingly, it is a object of the present invention to alleviate the disadvantages and deficiencies of the prior art by providing an identifying sleeve on the rearward portion of each socket, thereby quickly facilitating user recognition and selection of a desired socket.

It is another object of the present invention to provide a molded elastomeric sleeve that has size indicia thereon and, if desired, may be color coded.

It is yet another object of the present invention to provide a wrench socket having an identifying sleeve, which may be manufactured easily and economically, and which facilitates a merchandising and promotion of entire wrench kits or sets having sockets equipped with respective identifying sleeves.

It is a further object of the present invention to provide the following advantages and features: (1) prevents the socket from rolling off a workbench or other sloped or slanted surface; (2) improved legibility of the numbers for a quick identification of the desired socket; and (3) improved capability for gripping the socket, thereby generating increased torque when the socket is turned manually.

In accordance with the broad teachings of the present invention, a socket for a ratchet wrench has respective forward and rearward portions disposed about a longitudinal axis, and a sleeve is secured on the rearward portion of the socket, the sleeve having size indicia thereon.

Preferably, the sleeve is molded from an elastomeric material, is cylindrical, and is secured concentrically to the cylindrical socket. A pair of spaced-apart knurled annular bands is formed on the sleeve, and the knurled bands are separated by a substantially smooth annular band on the sleeve.

In a preferred embodiment, a radially-projecting boss is formed on the sleeve, the boss having a recess formed therein, and the size indicia is carried by a pressure-sensitive adhesive label disposed in the recess in the boss.

In the preferred embodiment, the boss on the sleeve is rectangular in plan outline; the boss has a rim surrounding the recess, and the rim has flat top surfaces disposed in a plane which is substantially parallel to the longitudinal axis of the socket.

The means for securing the sleeve on the socket includes an internal annular groove formed therein, and an adhesive is disposed in the internal annular groove and radially between the sleeve and the socket.

In accordance with the further teachings of the present invention, there is herein disclosed an improved method of providing size indicia on the rearward portion of a wrench socket. The method includes the steps of molding an elastomeric sleeve. The sleeve has a boss provided with a recess therein; and the sleeve further has an internal annular groove and a pair of externally-accessible canals formed therein and communicating the internal annular groove in the sleeve with the recess in the boss. The sleeve further has an integrally-molded flap, the flap extending between the canals and into the internal annular groove. The sleeve is disposed concentrically on the rearward portion of the socket with a sliding fit therebetween. An adhesive is injected into one of the canals, such that the flap acts as a dam and blocks the flow of the adhesive through the other canal and directs the flow of adhesive into and around the internal annular groove. In this manner, the internal annular groove is substantially filled, thereby securely bonding the sleeve to the socket. A pressure-sensitive label is placed in the recess in the boss; the label covers the canals and has size indicia thereon. Preferably, a sealant is placed over the label.

These and other objects of the present invention will become apparent from a reading of the following specification, taken in conjunction with the enclosed drawings.

BRIEF DESCRIPTION OF THE DRAWINGS

FIG. 1 is a perspective view of a first embodiment of a typical wrench socket having an elastomeric identifying sleeve carried on the rearward portion of the socket.

FIG. 2 is a side elevation of the socket and sleeve of FIG. 1.

FIG. 3 is an end view thereof, taken along the lines 3—3 of FIG. 2, and looking into the hexagonal bore in the socket.

FIG. 4 is a longitudinal section of the socket and sleeve, taken across the lines 4—4 of FIG. 3, and showing the sleeve substantially coterminous, radially, with the outer diameter of the socket (with respect to certain sockets).

FIG. 5 is a partial longitudinal section, corresponding substantially to a portion of FIG. 4, but showing how the sleeve may extend, radially, somewhat beyond the outer diameter of the socket (with respect to certain other sockets).

FIG. 6 is a partial longitudinal section, corresponding to a portion of FIG. 4, but showing the sleeve extending radially of the socket, and further showing the sleeve adhesively secured on the rearward portion of the socket (without an annular shoulder formed on the socket between the forward and rearward portions thereof).

FIG. 15 is a perspective view of a third (and preferred) embodiment of the teachings of the present invention, showing a radially-projecting boss on the sleeve carried by the socket.

FIG. 16 is a longitudinal cross-section taken along lines 16—16 of FIG. 15.

FIG. 17 is a cross-sectional view taken along lines 17—17 of FIG. 16.

FIG. 18 is an enlarged longitudinal section, corresponding substantially to a portion of FIG. 16, and showing the label disposed within the recess in the boss on the sleeve.

FIG. 19 is a section view taken across the lines 19—19 of FIG. 18, and corresponding substantially to an enlarged portion of FIG. 17.

FIG. 26 is a perspective view of the socket with its sleeve secured thereon, further showing the laminated label in exploded relationship.

FIG. 27 corresponds substantially to FIG. 26, but shows the label adhesively secured within the recess in the boss on the sleeve.

FIG. 28 is a partial longitudinal section, taken along line 28—28 of FIG. 27 and drawn to an enlarged scale, and showing the laminated label secured within the recess in the boss.

FIG. 29 is a partial section, taken along the lines 29—29 of FIG. 27 and drawn to an enlarged scale, and showing a clear ultraviolet light-cured sealant placed over the laminated label.

FIG. 30 corresponds substantially to FIG. 19, but illustrates an alternate embodiment of the sleeve, wherein a pair of externally-accessible spaced-apart canals is formed in the sleeve, the canals communicating with the internal annular groove formed in the sleeve, thereby facilitating an improved method for injecting an adhesive into the internal annular groove in the sleeve for securing the sleeve to the wrench socket.

FIG. 31 is a cross-sectional view thereof, taken across the lines 31—31 of FIG. 30, and showing a flap molded integrally with the sleeve, the flap extending into the internal annular groove in the sleeve.

FIG. 32 corresponds substantially to FIG. 31, but shows the adhesive being injected into one of the canals in the sleeve, such that the flap acts as a dam to insure that the adhesive flows into the internal annular groove, and such that the air entrapped in the internal annular groove escapes out of the other canal ahead of the adhesive flowing into the internal annular groove.

FIG. 33 is a cross-section of the entire sleeve on the socket, showing the adhesive substantially filling the internal annular groove, thereby securely retaining the sleeve on the socket.

FIG. 34 corresponds substantially to a portion of FIG. 33, but illustrates the pressure-sensitive adhesive label (with the size indicia thereon) disposed in the recess in the boss on the sleeve, thereby covering the canals.

GENERAL DESCRIPTION OF THE PREFERRED EMBODIMENTS

Figure 7:
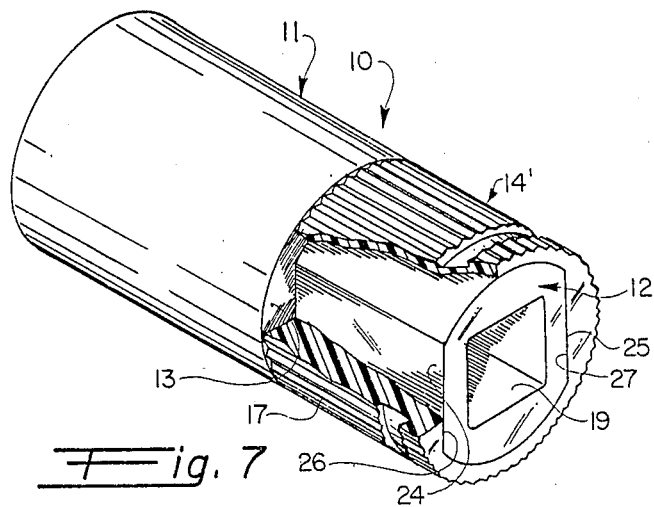
FIG. 7 is a perspective of a second embodiment of a typical wrench socket having an elastomeric sleeve carried on the rearward portion thereof.
Figures 9, 10:
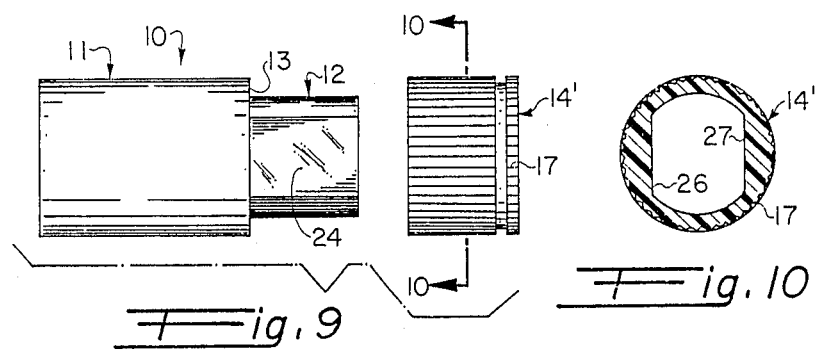
FIG. 9 is an exploded view, showing the socket and sleeve of FIG. 7 in side elevation.
FIG. 10 is a cross-sectional view of the socket, taken along the lines 10—10 of FIG. 9, and showing the "double dee" configuration for keying the socket to the sleeve.
Figure 8:
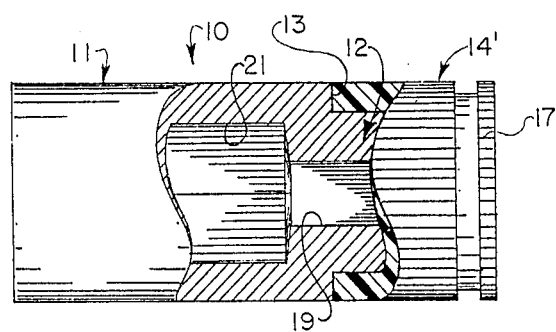
FIG. 8 is a longitudinal section, partially in elevation of the socket and sleeve of FIG. 7.

With reference to FIGS. 1-4, the first embodiment of the wrench socket 10 has a forward portion 11 and a rearward portion 12. The rearward portion 12 may be diametrically-reduced (or turned down) to form an annular shoulder 13 between the forward and rearward portions of the socket. A sleeve 14 is carried on the reduced rearward portion of the socket and may abut (or seat) against the annular shoulder. Preferably, the sleeve 14 is integrally molded from a suitable plastic, rubber or other elastomeric material. A suitable adhesive (denoted schematically by 15 in FIG. 4) secures the sleeve on the socket and precludes an axial separation therebetween.

Figure 13:
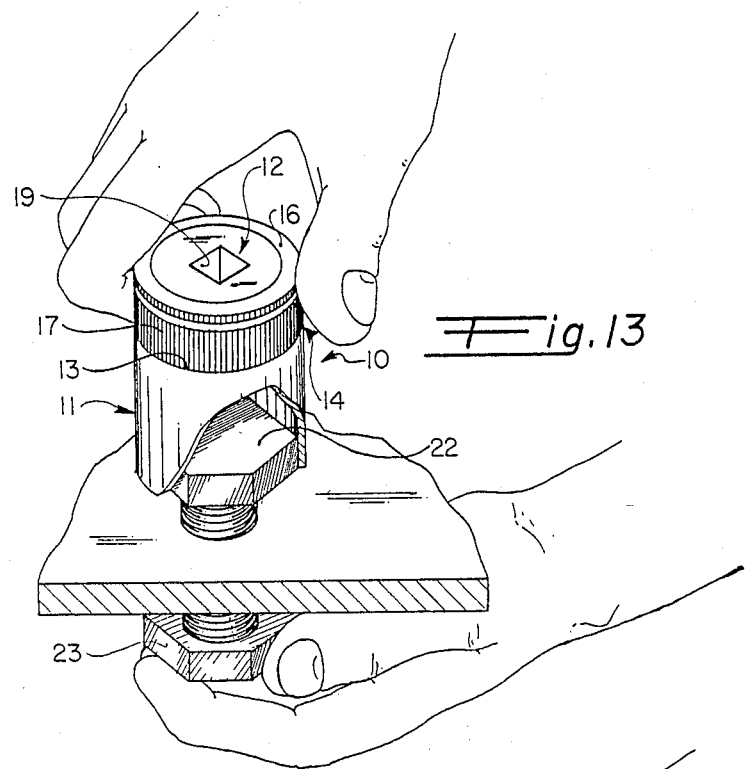
FIG. 13 illustrates how the knurls on the sleeve may be grasped by the user for improved gripping and convenience in rotating the socket for seating the nut on the bolt in a typical application.

The sleeve 14 has an end face 16 which, preferably, is coterminous (axially) with the rearward end of the socket, as shown more clearly in FIG. 4. The sleeve further has an outer diameter which is substantially coterminous (radially) with the outer diameter of the forward portion 11 of the socket, again as shown more clearly in FIG. 4. The outer diameter of the sleeve is provided with a plurality of longitudinal knurls 17 (or other flutes or splines) to facilitate a manual gripping of the sleeve (as shown in FIG. 13). There are two knurled annular bands separated by a smooth annular band 17A. These knurls also tend to prevent the socket from rolling, if placed sideways on a flat surface. The axial length of the sleeve may range from about ½" to 1" for most sockets.

The sleeve 14 is provided with suitable size indicia (generally indicated as at 18 in FIG. 2) disposed in a suitable recess 18A for easy identification and selection in a tool box or kit. The indicia (numbers and/or letters) are preferably molded within the sleeve and may be raised or projecting; and, if desired, the indicia may be molded clear through, so that the underlying socket portion is visible. The sleeve may also be color coded.

As shown more clearly in FIG. 4, the socket has a square drive input bore 19 provided with spaced pockets 20. These pockets 20 are adapted to receive the conventional ball detent (not shown) carried on the drive tang or stud of the wrench. The socket further has a conventional hexagonal drive output bore 21 for cooperation with the head of a bolt 22 (shown in FIGS. 13 and 14) or the nut 23.

With respect to some other sockets in the kit, the sleeve 14 may extend somewhat (radially) beyond the outer diameter of the forward portion of the socket, as shown in FIG. 5, but is still substantially coterminous therewith.

As shown in FIG. 6, the sleeve 14 is carried on the rearward portion of the socket 10 (being adhesively secured thereto) and there is no annular shoulder between the respective forward and rearward portions of the socket.

With respect to FIGS. 7-10 (wherein like numbers are used for similar parts) an alternate or second embodiment is illustrated wherein the rearward portion 12 of the socket 10 is provided with a pair of diametrically-opposed flats 24 and 25. These flats cooperate with a pair of corresponding diametrically-opposed flats 26 and 27 formed within the sleeve 14'. The cooperating flats provide a means for keying the sleeve 14' to the socket 10 and further precluding relative rotation therebetween.

Figure 11:
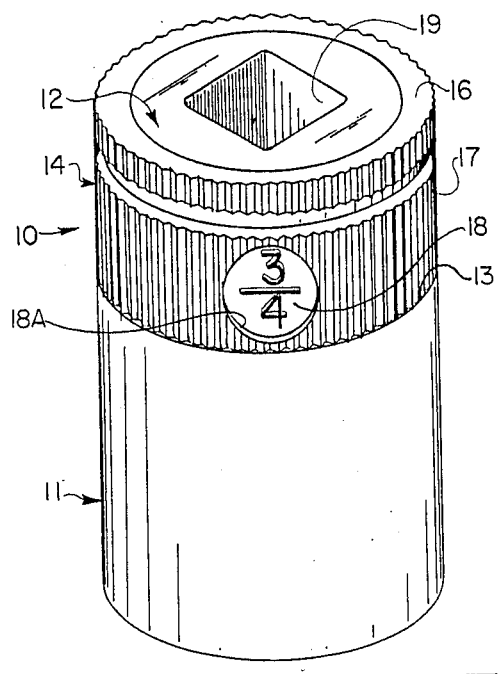
FIG. 11 is a further perspective of the socket and sleeve of FIG. 1, showing the raised molded-in indicia, as the socket is oriented with its hex output socket portion facing down.
Figure 12:
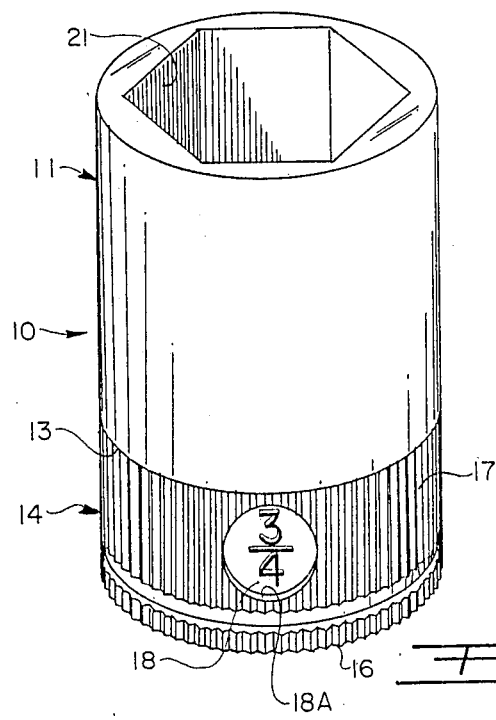
FIG. 12 is a still further perspective, corresponding substantially to FIG. 11, but showing the other side of the socket, and with the hex output socket portion facing up.

As shown in FIG. 11, the socket 10 is facing down, its sleeve 14 is facing up, and the "¾" molded-in raised indicia 18 disposed in a suitable recess 18A on the sleeve is clearly visible. On the diametrically-opposed other side of the sleeve 14, the indicia 18 (such as the "¾" size marking) is reversed or inverted. With this arrangement, when the hex output portion of the socket is facing up as shown in FIG. 12, the "¾" indicia disposed in the recess 18A on the sleeve will be properly oriented for easy inspection, recognition and selection.

Figure 14:
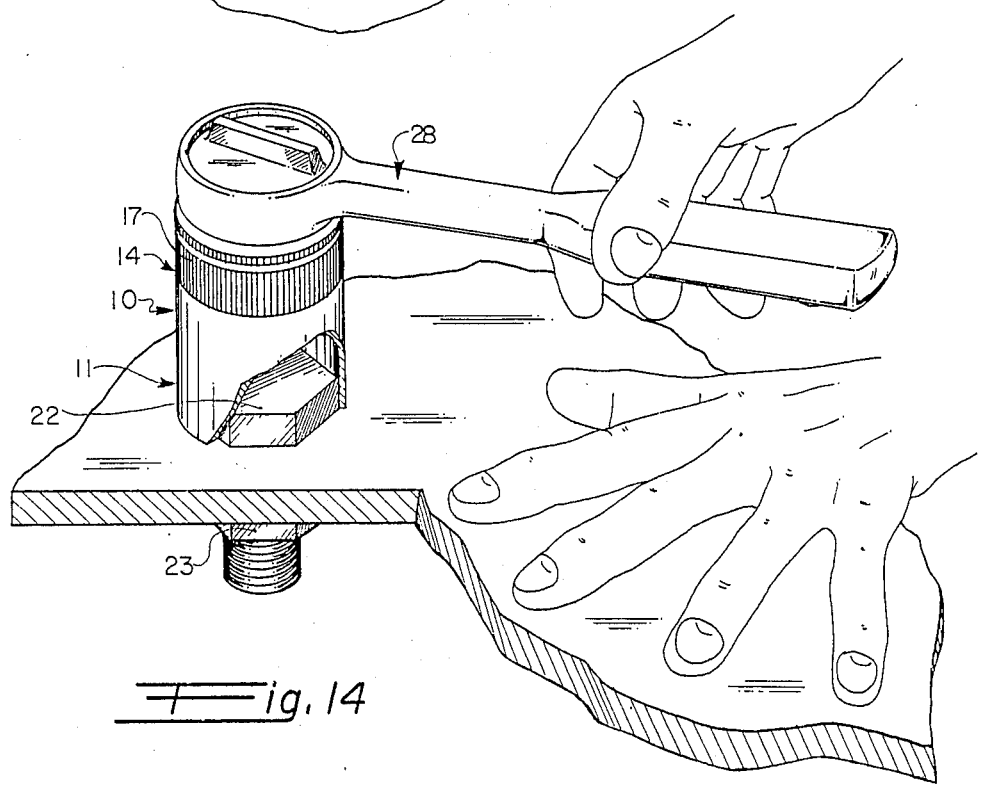
FIG. 14 illustrates the subsequent torquing of the bolt, using a conventional ratchet wrench for driving the socket.
Figure 20:
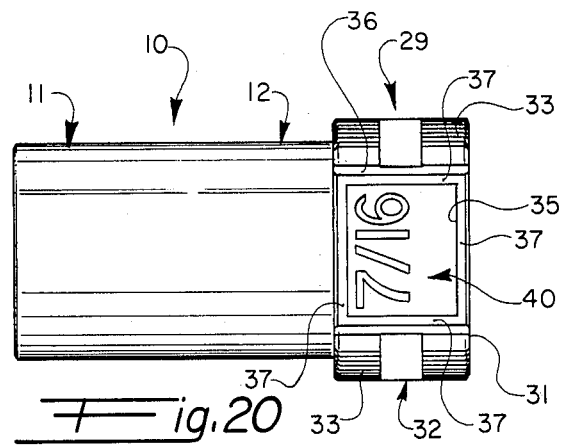
FIG. 20 is an elevational view of the sleeve and the associated socket of FIG. 15.

As shown in FIG. 13, the sleeve 14 may be grasped by the user to conveniently rotate the socket 10 for driving the bolt 22 on the nut 23. The sleeve 14 provides improved gripping and torque. Thereafter, and when the nut is seated as shown in FIG. 14, the conventional ratchet wrench 28 may be used to torque the bolt.

With reference to FIGS. 15-20 a third embodiment of a sleeve 29 is illustrated for use with a conventional wrench socket 10.

As in the previous embodiments, the sleeve 29 is preferably integrally molded from a suitable plastic, rubber or other elastomeric material. A suitable adhesive (denoted schematically by 30 in FIGS. 18 and 19) secures the sleeve 29 on the socket 10 and precludes an axial separation therebetween.

Figure 21:
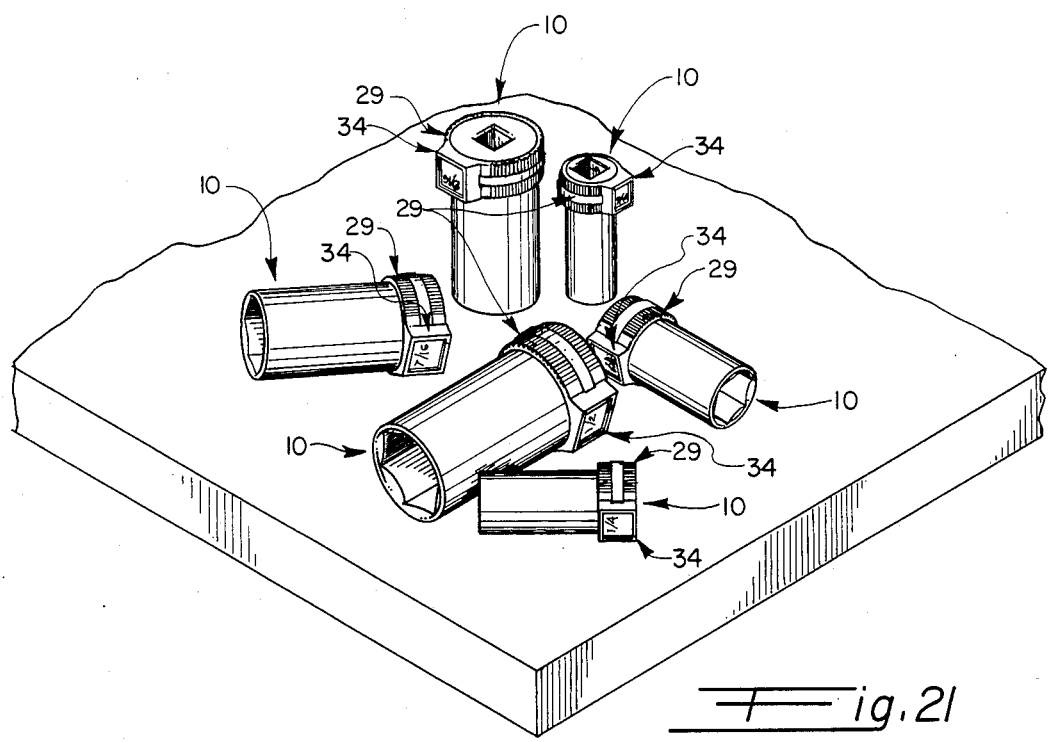
FIG. 21 illustrates how the sleeve precludes the sockets from rolling, when placed on their cylindrical side walls on a flat surface, such as the top of a table.

With reference to FIGS. 16 and 18, the sleeve 29 has an end face 31 which, preferably, is coterminous (axially) with the rearward end of the socket. The sleeve 29 has an outer diameter 32 provided with a plurality of longitudinal knurls 33 (or other flutes of splines) to facilitate a manual gripping of the sleeve 29 and to prevent the socket from rolling (as shown in FIG. 21). The knurls 33 are separated by a smooth annular band 33A.

The sleeve 29 has a boss 34 integrally molded thereon and extending radially of the sleeve 29. As illustrated, the boss 34 is substantially square in shape. However, the boss 34 may be circular, rectangular or any other suitable shape.

The boss 34 has a recess 35 formed therein. This recess 35 is defined by a peripheral rim 36. This rim 36 has respective top surfaces 37 which are disposed substantially within a common plane. Preferably, this plane is substantially parallel to the longitudinal axis of the socket 10. The boss 34 precludes the socket 10 from rolling when the socket (with its sleeve 29) is placed sideways (on its cylindrical side wall) on a flat surface such as the top of a table (as in FIG. 21). The boss also facilitates a manual rotation of the socket by providing a surface upon which pressure may be applied.

With further reference to FIGS. 18 and 19, the sleeve 29 has an internal annular groove 38 formed therein. When the sleeve 29 is positioned on the socket 10, the groove 38 communicates with the cylindrical side wall of the socket 10. It is within this annular groove 38 that the adhesive 30 is disposed, contacting the cylindrical wall of the socket and thereby securing the sleeve on the socket.

The sleeve further has a radial passageway 39 formed therein. This radial passageway 39 extends from the internal annular groove 38 to the recess 35 in the boss 34 on the sleeve 29, providing communication therebetween.

Figure 22:
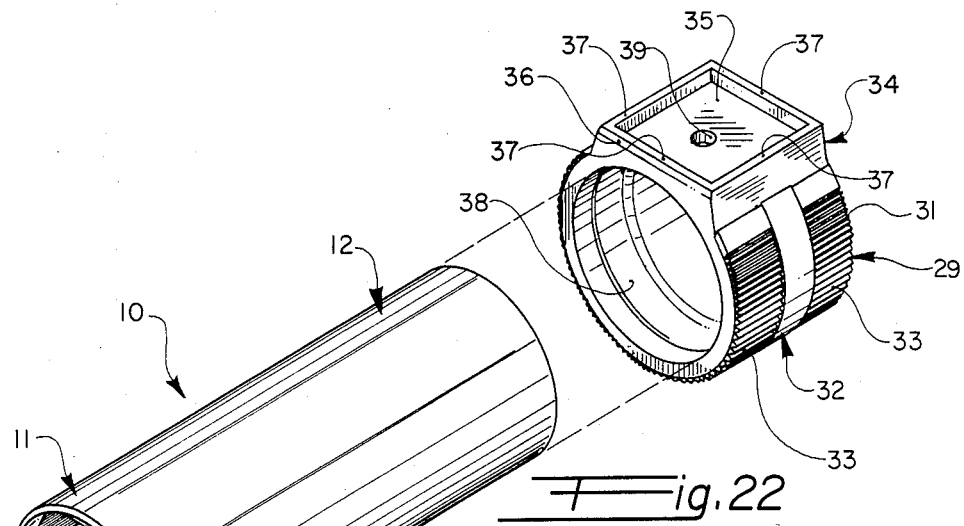
FIG. 22 is an exploded view, in perspective, of the socket and sleeve of FIG. 15, illustrating a preferred method of manufacture thereof, the laminated label being removed from the sleeve.
Figure 23:
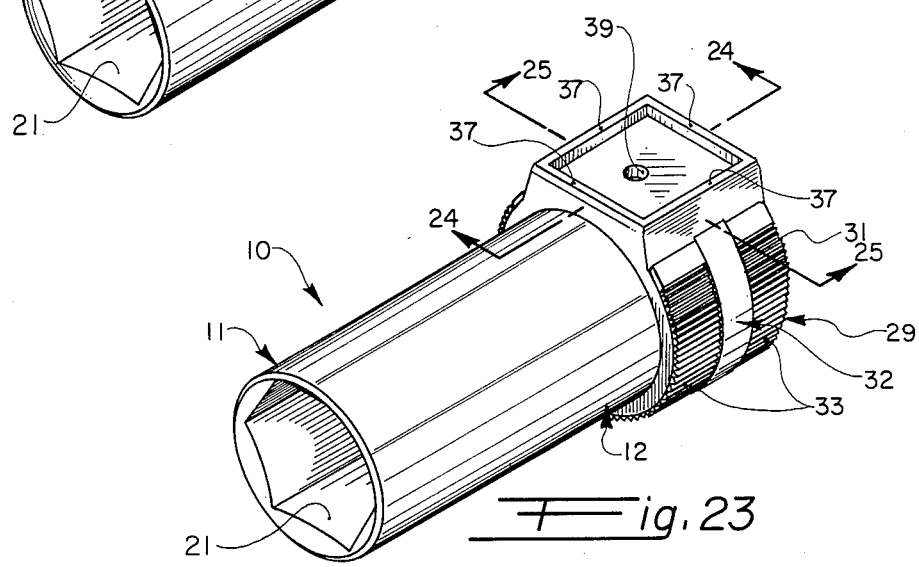
FIG. 23 shows manner in which the sleeve is slidably disposed on the socket.
Figure 24:
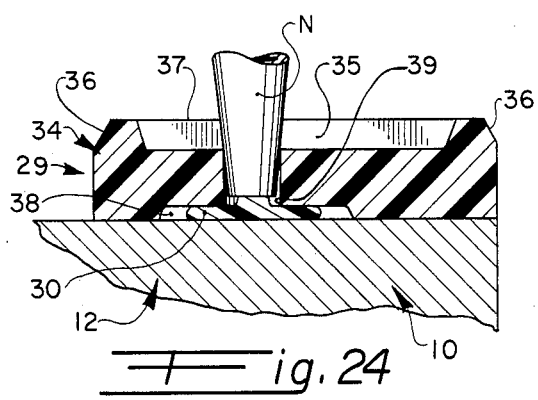
FIG. 24 is a partial longitudinal section, taken along lines 24—24 of FIG. 23 and drawn to an enlarged scale, and showing the adhesive being injected from a nozzle through the radial passageway and into the internal annular groove.
Figure 25:
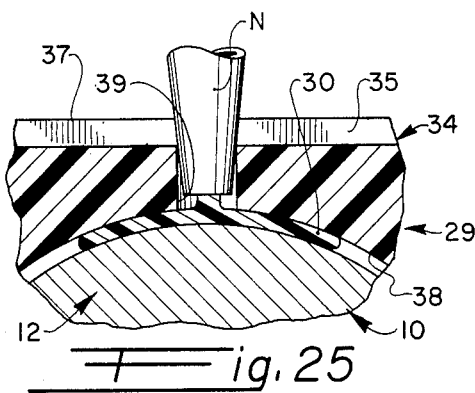
FIG. 25 is a partial section, taken along line 25—25 of FIG. 23 and drawn to an enlarged scale, and further illustrating the injection of the adhesive.

With reference to FIGS. 22-27, a method of securing the sleeve 29 on the wrench socket 10 is illustrated. The molded elastomeric sleeve 29 is axially-oriented relative to the longitudinal axis of the conventional socket 10 (as shown in FIG. 22). The sleeve 29 is then slidably disposed on the rearward portion of the socket (as shown in FIG. 23) such that the end face 31 of the sleeve is preferably coterminous (axially) with the rearward end of the socket (as shown in FIG. 24).

The mouth of an injection nozzle N is then disposed in the radial passageway 39. Adhesive is injected by the nozzle N into the annular groove 38 via the radial passageway 39. The adhesive 30 is injected into the groove 38 between at least a portion of the sleeve and the socket, thereby securing the sleeve to the socket. Preferably, however, the groove 38 is completely filled with the adhesive. While not preferred, it is possible that at least a portion of the radial passageway 39 may also become filled with adhesive.

With reference to FIGS. 28 and 29, the size indicia means preferably constitutes a pressure-sensitive laminated label 40 having indicia and adhesive thereon. Preferably, label 40 has an upper portion 41 of clear polyester (a protective laminate) although, as will be understood by those skilled in the art, this upper portion 41 is optional and may be omitted without destroying the utility thereof. An indicia portion 42 is formed of, preferably, a clear polyester. The appropriate or desired indicia may be impression stamped, printed, engraved or otherwise suitably disposed thereon. Finally, a lower adhesive portion 43 is provided. This lower portion 43 is preferably formed of a metalized polyester that is silver colored (or any other desired color). An acryllic adhesive (as known to those skilled in the art) is disposed on that portion of the lower portion 43 which contacts the recess 35.

The laminated label 40 is sized so as to be received within the recess 35 in the boss 34 below the rim 36, such that the adhesive portion 43 contacts the recess 35, and such that the laminated label 40 covers the radial passageway 39 and the adhesive 30. If desired, a clear ultraviolet light-cured sealant 44 is disposed over the upper portion 41 (as shown in FIG. 29). Preferably, this sealant 44 is impervious to most hydrocarbon and liquid substances utilized in the automotive industry. This sealant 44 aids in securing the label in the recess and in preventing liquids and hydrocarbons from contacting the indicia and/or the adhesive. Preferably, the indicia 42 is disposed on the label 40 such that, when the label 40 is positioned within the recess 35 with the lower adhesive portion 43 contacting the recess 35, the indicia is visible to the user to facilitate a convenient recognition and selection of the desired socket.

The indicia 42 may be provided by a hot-stamping process or a pad printing process, if desired.

Accordingly, and as appreciated by those skilled in the art, the sleeve 29 has numerous features and advantages. The sleeve is easily and economically manufactured and does not require that new dies, etc., to be fabricated for the manufacture of wrench sockets which are adaptable for use therewith. Rather, this sleeve is adaptable for use with presently existing wrench sockets which may already be in stock and/or for which tooling for manufacture is already available. In this manner, the sleeve 29 facilitates the manufacture, merchandising and promotion of the sockets and entire wrench kits (or sets) the latter having sockets equipped with respective identifying sleeves 29.

With reference to FIGS. 30–34, a fourth (and preferred) embodiment is illustrated, constituting an improved method for securing the sleeve 29 to the socket 10. The sleeve 29 has a pair of externally-accessible spaced-apart canals 45A and 45B formed therein. The canals 45A and 45B communicate the internal annular groove 38 in the sleeve 29 with the recess 35 formed in the boss 34, the boss 34 being formed integrally with the sleeve 29. Preferably, the canals 45A and 45B are formed substantially parallel to one another. A flap 46 is formed integrally with the sleeve 29 and extends into the internal annular groove 38 formed therein. The flap is disposed between the canals 45A and 45B, as shown in FIG. 30.

The adhesive 30 is injected into one of the canals, as for example canal 45B, by means of a suitable nozzle 47 as shown more clearly in FIG. 32. As the adhesive 30 is injected by the nozzle 47 into the canal 45B, the flap 46 acts as a dam to block the flow of the adhesive 30 into the other canal 45A and assures that the adhesive 30 flows into and around the internal annular groove 38 between the socket 10 and the sleeve 29, thereby assuring a secure adhesive bond therebetween as shown more clearly in FIG. 33.

A portion of the adhesive 30 may extend partially into the other canal 45A, as shown again in FIG. 33, thereby providing a visual indication that the adhesive 30 has flowed around the internal annular groove 38, and thereby providing a convenient quality-control inspection technique to assure that an excellent adhesive bond has been achieved on each wrench socket and sleeve secured thereto.

Thereafter, and as shown more clearly in FIG. 34, the pressure-sensitive adhesive label 40 is received within the recess 35 in the boss 34 on the sleeve 29 (in the manner as previously described with the previous embodiments of FIGS. 15–29) to cover the canals 45A and 45B.

Obviously, many modifications may be made without departing from the basic spirit of the present invention. For example, in lieu of a sleeve, a cap or bushing may be used. Additionally, the present invention is applicable to "flex" sockets as well as extensions and drive extensions normally used with, or associated with, sockets. Accordingly, it will be appreciated by those skilled in the art that within the scope of the appended claims, the invention may be practice other than specifically described herein.

What is claimed is:

1. In a socket for a ratchet wrench, wherein the socket has respective forward and rearward portions disposed about a longitudinal axis, the combination of a sleeve on the rearward portion of the socket, the sleeve having an internal annular groove formed therein, adhesive disposed in the internal annular groove and radially between the sleeve and the socket, thereby securing the sleeve to the socket, the sleeve further having a pair of spaced-apart canals communicating with the internal annular groove in the sleeve, and a flap carried by the sleeve between the canals, the flap projecting into the internal annular groove, whereby the adhesive may be injected into one of the canals, such that the flap acts as a dam to block the flow of the adhesive into the other canal and directs the flow of adhesive into and around the internal annular groove as the air entrapped therein flows out of the other canal, thereby securely bonding the sleeve to the socket.

2. The combination of claim 1, wherein the sleeve has size indicia thereon.

3. The combination of claim 2, wherein a radially-projecting boss is formed on the sleeve, the boss having a recess formed therein, the pair of canals communicating the recess in the boss with the internal annular groove formed in the sleeve, and wherein the size indicia comprises a pressure-sensitive adhesive label disposed in the recess in the boss.

4. The combination of claim 3, wherein the label is disposed in the recess after the adhesive is applied, thereby covering the canals.

5. The combination of claim 4, further including a sealant disposed over the label.

6. The combination of claim 3, wherein the boss on the sleeve is rectangular in plan outline, the boss having a rim surrounding the recess, and the rim having flat top surfaces disposed in a plane which is substantially parallel to the longitudinal axis of the socket.

7. The combination of claim 1, wherein the sleeve is molded from an elastomeric material.

8. The combination of claim 1, wherein the sleeve is cylindrical and is secured concentrically on a cylindrical socket, and wherein a pair of spaced-apart knurled annular bands is formed on the sleeve, the knurled bands being separated by a substantially smooth annular band on the sleeve.

9. In a socket for a ratchet wrench, wherein the socket has respective forward and rearward portions disposed about a longitudinal axis, the combination of a cylindrical sleeve disposed concentrically on the rearward portion of the socket, the sleeve being molded from an elastomeric material, the sleeve having an internal annular groove formed therein, an adhesive disposed in the internal annular groove and radially between the sleeve and the socket, thereby securing the sleeve to the socket, the sleeve having a pair of spaced-apart knurled annular bands formed on the sleeve, the knurled bands being separated by a substantially smooth annular band on the sleeve, a radially-projecting boss formed on the sleeve, the boss having a recess formed therein and further having a rim surrounding the recess, the rim having flat top surfaces disposed in a plane which is substantially parallel to the longitudinal axis of the socket, and a pressure-sensitive adhesive label disposed in the recess in the boss, the label having size indicia thereon.

10. In a socket for a ratchet wrench, wherein the socket has respective forward and rearward portions disposed about a longitudinal axis, the combination of a cylindrical sleeve disposed concentrically on the rearward portion of the socket, the sleeve being molded from an elastomeric material, the sleeve having an internal annular groove formed therein, the groove being in communication with the socket, the sleeve further having a radially-projecting boss formed thereon, the boss having a recess formed therein and further having a rim surrounding the recess, the rim having flat top surfaces disposed in a plane which is substantially parallel to the longitudinal axis of the socket, the sleeve further having a pair of spaced-apart canals communicating with the internal annular groove in the sleeve, a flap carried by the sleeve between the canals, the flap projecting into the internal annular groove, whereby an adhesive may be injected into one of the canals, such that the flap acts as a dam to block the flow of the adhesive into the other canal and directs the flow of adhesive into and around the internal annular groove as the air entrapped therein flows out of the other canal, thereby securely bonding the sleeve to the socket, a pressure-sensitive adhesive label disposed in the recess in the boss and covering the adhesive, the label having size indicia thereon, and the sleeve further having a pair of spaced-apart knurled annular bands formed thereon, the knurled bands being separated by a substantially smooth annular band on the sleeve.

11. In combination with a wrench socket having forward and rearward end portions, a sleeve secured on one of the end portions of the socket, the sleeve having an internal annular groove formed therein, the internal annular groove being disposed substantially concentrically of the socket, the sleeve further having a pair of spaced-apart canals formed therein, the canals in the sleeve communicating with the internal annular groove therein, and an adhesive substantially filling the internal annular groove and a portion of at least one of the canals in the socket.

12. In combination with a wrench socket having forward and rearward and portions, a sleeve on one of the end portions of the socket, the sleeve having an internal annular groove being disposed substantially concentrically of the socket, the sleeve further having a pair of spaced-apart canals formed therein, the canals in the sleeve communicating with the internal annular groove therein, and the canals being accessible externally of the sleeve, whereby an adhesive may be injected into one of the canals, such that the entrapped air in the internal annular groove may escape through the other canal, and whereby the adhesive substantially fills the internal annular groove, thereby securing the sleeve to the socket.

13. The combination of claim 12, further including a flap formed integrally with the sleeve and projecting into the internal annular groove between the canals therein, whereby as the adhesive is injected into the one canal, the flap acts as a dam to direct the adhesive around the internal annular groove in the socket and then partially fills the other canal.

14. The combination of claim 12, further including a boss formed on the sleeve, the boss having a recess formed therein, and the radial canals opening into the recess in the boss.

15. The combination of claim 14, wherein a pressure-sensitive adhesive label is disposed within the recess in the boss, the label covering the canals, and the label having size indicia thereon.

16. The combination of claim 14, wherein the sleeve has knurls formed externally thereon, thereby facilitating a manual rotation of the socket.

17. The combination of claim 16, wherein the knurls are separated by an annular smooth band.

18. The combination of claim 16, wherein the sleeve is secured on the rearward end portion of the socket.

19. In combination with a wrench socket having forward and rearward end portions, a molded elastomeric sleeve on the rearward end portion of the socket, a boss formed on the sleeve, the boss having a recess formed therein, the sleeve having an internal annular groove formed therein, the internal annular groove being disposed substantially concentrically of the socket, the sleeve further having a pair of spaced-apart canals formed therein, the canals in the sleeve communicating the internal annular groove therein with the recess in the boss on the sleeve, whereby the canals are accessible externally of the sleeve, a flap formed integrally with the socket and projecting into the internal annular groove between the canals therein, whereby an adhesive may be injected into one of the canals, whereby the flap acts as a dam to direct the adhesive around the internal annular groove in the socket and then partially fills the other canal as the entrapped air escapes out of the other canal, and whereby the adhesive substantially fills the internal annular groove, thereby securing the sleeve to the socket, a pressure-sensitive adhesive label disposed within the recess in the boss, the label covering the canals, the label having size indicia thereon, and the sleeve having knurls formed externally thereon, thereby facilitating a manual rotation of the socket.

20. The method of providing size indicia on the rearward end of a socket for a ratchet wrench, comprising the steps of molding a sleeve from an elastomeric material, the sleeve having an internal annular groove formed therein, the sleeve further a pair of externally-accessible spaced-apart canals formed therein and communicating with the internal annular groove, the sleeve still further having a flap formed integrally therewith, the flap projecting into the internal annular groove, injecting an adhesive into one of the canals, such that the flap acts as a dam, and such that the adhesive flows around the internal annular groove as the entrapped air flows out of the other canal, whereby the adhesive substantially fills the internal annular groove, thereby securing the sleeve to the socket, and providing size indicia on the sleeve.

21. The method of claim 20, further including the steps of molding a boss of the sleeve, the boss having a recess therein, the canals opening into the recess in the boss, and placing a pressure-sensitive adhesive label in the recess in the boss, the label covering the canals, and the label having sized indicia thereon.

22. The method of claim 20, further including the step of molding knurls on the external surface of the sleeve.

23. The method of providing size indicia on the rearward end of a socket for a ratchet wrench, comprising the steps of molding a sleeve from an elastomeric material, the sleeve having external knurls molded therein, the sleeve further having a boss formed integrally therewith, the boss having a recess formed therein, the sleeve having an internal annular groove formed therein, the sleeve further a pair of externally-accessible spaced-apart canals formed therein and communicating the internal annular groove in the sleeve with the recess in the boss on the sleeve, the sleeve still further having a flap formed integrally therewith, the flap projecting into the internal annular groove, injecting an adhesive into one of the canals, such that the flap acts as a dam, and such that the adhesive flows around the internal annular groove as the entrapped air flows out of the other canal, whereby the adhesive substantially fills the internal annular groove, thereby securing the sleeve to the socket, providing a pressure-sensitive adhesive label and placing the label in the recess in the boss, the label covering the canals, and the label having size indicia thereon.

24. The method of providing size indicia on the rearward portion of a wrench socket, comprising the steps of molding an elastomeric sleeve, the sleeve having a boss provided with a recess therein, the sleeve further having an internal annular groove formed therein, the sleeve further having a pair of externally-accessible canals formed therein and communicating the internal annular groove in the sleeve with the recess in the boss, the sleeve further having an integrally-molded flap, the flap extending between the canals and into the internal annular groove, disposing the sleeve concentrically on the rearward portion of the socket with a sliding fit therebetween, injecting an adhesive into one of the canals, such that the flap acts as a dam and blocks the flow of the adhesive through the other canal and directs the flow of adhesive into and around the internal annular groove, thereby substantially filling the internal annular groove, and thereby securely bonding the sleeve to the socket, and placing a pressure-sensitive laminated label in the recess in the boss, the label covering the canals, and the label having size indicia thereon.

25. In a wrench socket, wherein the socket has a cylindrical side wall, and wherein the socket further has respective forward and rearward portions, a sleeve, means for securing the sleeve on the rearward portion of the socket, a radially-projecting boss means formed on the sleeve for preventing the socket from rolling when the cylindrical side wall of the socket is placed on a flat surface such as a table top, the boss means having a recess formed therein and further having a rim surrounding the recess, a label disposed within the recess in the boss means and below the rim thereof, the label having size indicia thereon, and a substantially clear sealant disposed over the label within the recess.

26. The combination of claim 25, wherein the means for securing the sleeve to the rearward portion of the socket comprises the sleeve having an internal annular groove formed therein, and an adhesive disposed in the internal annular groove and radially between the sleeve and the socket.

27. The combination of claim 25, wherein the sleeve has a pair of spaced-apart knurled annular bands formed thereon, the knurled bands being separated by a substantially smooth annular band.

28. The combination of claim 25, wherein the sealant comprises a clear ultraviolet light-cured sealant.

29. In a socket for a ratchet wrench, wherein the socket has cylindrical side wall, and wherein the socket further has respective forward and rearward portions disposed about a longitudinal axis, a cylindrical sleeve molded from an elastomeric material, means for securing the sleeve concentrically on the rearward portion of the socket and about the longitudinal axis thereof, the sleeve having a radially-projecting boss means formed thereon for preventing the socket from rolling when the cylindrical side wall of the socket is placed on a flat surface such as a table top, the boss means having a recess formed therein and further having a peripheral rim surrounding the recess, a pressure-sensitive adhesive label disposed within the recess and below the rim thereof, the label having size indicia thereon, a substantially clear sealant over the label within the recess in the boss on the sleeve, and the sleeve having a pair of spaced-apart knurled annular bands, the knurled annular bands being separated by a substantially smooth annular band.

* * * * *